United States Patent
Cano et al.

(10) Patent No.: US 9,595,257 B2
(45) Date of Patent: Mar. 14, 2017

(54) DOWNSAMPLING SCHEMES IN A HIERARCHICAL NEURAL NETWORK STRUCTURE FOR PHONEME RECOGNITION

(75) Inventors: Daniel Andrés Vásquez Cano, Ulm (DE); Guillermo Aradilla, Nantes (FR); Rainer Gruhn, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 142 days.

(21) Appl. No.: 13/497,119

(22) PCT Filed: Sep. 28, 2009

(86) PCT No.: PCT/US2009/058563
§ 371 (c)(1),
(2), (4) Date: Jun. 6, 2012

(87) PCT Pub. No.: WO2011/037587
PCT Pub. Date: Mar. 31, 2011

(65) Prior Publication Data
US 2012/0239403 A1    Sep. 20, 2012

(51) Int. Cl.
*G10L 15/00* (2013.01)
*G10L 15/04* (2013.01)
(Continued)

(52) U.S. Cl.
CPC .................... *G10L 15/02* (2013.01)

(58) Field of Classification Search
None
See application file for complete search history.

(56) References Cited

U.S. PATENT DOCUMENTS 5,377,302 A * 12/1994 Tsiang .................... G10L 15/16
                                                          704/231
5,794,192 A *  8/1998 Zhao ...................... G10L 15/10
                                                          704/240

(Continued)

OTHER PUBLICATIONS

Pinto, J.; Yegnanarayana, B.; Hermansky, H.; Magimai-Doss, M., "Exploiting contextual information for improved phoneme recognition," Acoustics, Speech and Signal Processing, 2008. ICASSP 2008. IEEE International Conference on , vol., no., pp. 4449,4452, Mar. 31, 2008-Apr. 4, 2008.*

(Continued)

*Primary Examiner* — Richemond Dorvil
*Assistant Examiner* — Thuykhanh Le
(74) *Attorney, Agent, or Firm* — Sunstein Kann Murphy & Timbers LLP

(57) ABSTRACT

An approach for phoneme recognition is described. A sequence of intermediate output posterior vectors is generated from an input sequence of cepstral features using a first layer perceptron. The intermediate output posterior vectors are then downsampled to form a reduced input set of intermediate posterior vectors for a second layer perceptron. A sequence of final posterior vectors is generated from the reduced input set of intermediate posterior vectors using the second layer perceptron. Then the final posterior vectors are decoded to determine an output recognized phoneme sequence representative of the input sequence of cepstral features.

7 Claims, 5 Drawing Sheets

(A)

(B)

(51) Int. Cl.
*G10L 15/14* (2006.01)
*G10L 15/16* (2006.01)
*G10L 21/00* (2013.01)
*G10L 25/00* (2013.01)
*G10L 15/02* (2006.01)

(56) References Cited

U.S. PATENT DOCUMENTS

| | | | | |
|---|---|---|---|---|
| 6,413,098 B1 * | 7/2002 | Tallal | ............... | G09B 5/065 434/118 |
| 6,513,004 B1 * | 1/2003 | Rigazio | ............... | G10L 15/02 704/236 |
| 6,691,090 B1 * | 2/2004 | Laurila | ............... | G10L 15/02 704/205 |
| 6,799,171 B1 * | 9/2004 | Van Kommer | ...... | G06N 3/0454 706/20 |
| 7,454,342 B2 * | 11/2008 | Nefian | ............... | G06K 9/6293 704/256 |
| 8,554,550 B2 * | 10/2013 | Nagaraja | ............ | G10L 19/012 704/200 |
| 2002/0160341 A1 * | 10/2002 | Yamada | ............ | G09B 5/065 434/157 |
| 2003/0004720 A1 * | 1/2003 | Garudadri | ............ | G10L 15/30 704/247 |
| 2004/0186718 A1 * | 9/2004 | Nefian | ............... | G06K 9/6293 704/256 |
| 2005/0049872 A1 * | 3/2005 | Dharanipragada | ...... | G10L 15/02 704/256 |
| 2005/0114141 A1 * | 5/2005 | Grody | ............... | G10L 15/30 704/270 |
| 2006/0277038 A1 * | 12/2006 | Vos | ............... | G10L 19/0208 704/219 |
| 2009/0055177 A1 * | 2/2009 | Kang | ............... | G10L 15/20 704/244 |
| 2009/0271187 A1 * | 10/2009 | Yen | ............... | G10L 21/0208 704/226 |
| 2010/0286984 A1 * | 11/2010 | Wandinger | ............ | G10L 15/04 704/251 |

OTHER PUBLICATIONS

Schwarz, P.; Matejka, P.; Cernocky, J., "Hierarchical Structures of Neural Networks for Phoneme Recognition," Acoustics, Speech and Signal Processing, 2006. ICASSP 2006 Proceedings. 2006 IEEE International Conference on , vol. 1, no., pp. 1,I, May 14-19, 2006.*

Pinto, J.; Yegnanarayana, B.; Hermansky, H.; Magimai-Doss, M., "Exploiting contextual information for improved phoneme recognition," Acoustics, Speech and Signal Processing, 2008. ICASSP2008, p. 4449-4452, IEEE International Conference on Mar. 31, 2008-Apr. 4, 2008.*

Schwarz, P.; Matejka, P.; Cernocky, J., "Hierarchical Structures of Neural Networks for Phoneme Recognition," Acoustics, Speech and Signal Processing, 2006. ICASSP 2006 Proceedings. 2006 IEEE International Conference on, vol. 1, no., pp. I,I, May 14-19, 2006.*

* cited by examiner (A)

(B)

DOWNSAMPLING SCHEMES IN A HIERARCHICAL NEURAL NETWORK STRUCTURE FOR PHONEME RECOGNITION

FIELD OF THE INVENTION

The present invention relates to automatic speech recognition, and more specifically phoneme recognition in a hierarchical neural network.

BACKGROUND ART

A phoneme is the minimal unit of speech sound in a language that can serve to distinguish meaning. Phoneme recognition can be applied to improve automatic speech recognition. Other applications of phoneme recognition can also be found in speaker recognition, language identification, and keyword spotting. Thus, phoneme recognition has received much attention in the field of automatic speech recognition.

One common and successful approach for phoneme recognition uses a hierarchical neural network structure based on a hybrid hidden Markov model (HMM)-Multilayered Perceptron (MLP) arrangement. The MLP outputs are used as HMM state emission probabilities in a Viterbi decoder. This approach has the considerable advantage that the MLP can be trained to discriminatively classify phonemes. The MLP also can easily incorporate a long temporal context without making explicit assumptions. This property is particularly important for phoneme recognition because phoneme characteristics can be spread over a large temporal context.

Many different approaches have been proposed to continue to exploit the contextual information of a phoneme. One approach is based on a combination of different specialized classifiers that provides considerable improvements over simple generic classifiers. For instance, in the approach known as TRAPS, long temporal information is divided into frequency bands, and then, several classifiers are independently trained using specific frequency information over a long temporal range. See H. Hermansky and S. Sharma, *Temporal Patterns (TRAPS) in ASR of Noisy Speech*, in Proc. ICASSP, 1999, vol. 1, pp. 289-292, incorporated herein by reference. Another different technique splits a long temporal context in time. See D. Vasquez et al., *On Expanding Context By Temporal Decomposition For Improving Phoneme Recognition*, in SPECOM, 2009, incorporated herein by reference. A combination of these two approaches which splits the context in time and frequency is evaluated in P. Schwarz et al., *Hierarchical Structures Of Neural Networks For Phoneme Recognition*, in Proc. ICASSP, 2006, pp. 325-328, incorporated herein by reference.

Another phoneme recognition structure was proposed in J. Pinto et al., *Exploiting Contextual Information For Improved Phoneme Recognition*, in Proc. ICASSP, 2008, pp. 4449-4452, (hereinafter "Pinto", incorporated herein by reference). Pinto suggested estimating phoneme posteriors using a two-layer hierarchical structure. A first MLP estimates intermediate phoneme posteriors based on a temporal window of cepstral features, and then a second MLP estimates final phoneme posteriors based on a temporal window of intermediate posterior features. The final phoneme posteriors are then input to a phonetic decoder for obtaining a final recognized phoneme sequence.

The hierarchical approach described by Pinto significantly increases system accuracy, compared to a non-hierarchical scheme (a single layer). But computational time is greatly increased because the second MLP has to process the same number of speech frames as were processed by the first MLP. In addition, the second MLP has an input window with a large number of consecutive frames, so there are a high number of parameters that must be processed. These factors make it less practical to implement such a hierarchical approach in a real time application or in an embedded system.

SUMMARY OF THE INVENTION

Embodiments of the present invention are directed to phoneme recognition. A sequence of intermediate output posterior vectors is generated from an input sequence of cepstral features using a first layer perceptron. The intermediate output posterior vectors are then downsampled to form a reduced input set of intermediate posterior vectors for a second layer perceptron. A sequence of final posterior vectors is generated from the reduced input set of intermediate posterior vectors using the second layer perceptron. Then the final posterior vectors are decoded to determine an output recognized phoneme sequence representative of the input sequence of cepstral features.

In further embodiments, intra-phonetic information and/or inter-phonetic information may be used for decoding the final posterior vectors. The downsampling may be based on a window downsampling arrangement or a temporal downsampling arrangement, for example, using uniform downsampling or non-uniform downsampling. The downsampling may be based on using an intermediate phoneme decoder to determine possible phoneme boundaries. And the perceptrons may be arrangements within a Hybrid Hidden Markov Model-Multilayer Perceptron (HMM-MLP) phoneme classifier.

Embodiments also include an application or device adapted to perform the method according to any of the above. For example, the application may be a real time application and/or an embedded application.

DETAILED DESCRIPTION OF SPECIFIC EMBODIMENTS

In phoneme recognition, the goal is to find the most probable corresponding phoneme or phoneme-state sequence $S=\{s_1, s_2, \ldots, s_L\}$ given a sequence of observations or cepstral vectors $X_0=\{x_1, \ldots, x_t, \ldots, x_K\}$, where $K \geq L$. In the following discussion, the phoneme recognition approach is discussed based on a Hybrid HMM/MLP where the MLP outputs are used as HMM state emission probabilities. An MLP has the additional advantage of incorporating a long context in the form of a temporal window of N cepstral features. Therefore, the set of acoustic vectors at the input of the MLP is $X=\{x_1^N, \ldots, x_t^N, x_K^N\}$ where:

$$x_t^N = \left\{x_{t-\frac{N-1}{2}}, \ldots, x_t, \ldots, x_{t+\frac{N-1}{2}}\right\}$$

The emission probabilities in an HMM state can be estimated by scaled likelihoods according to the Bayes' rule:

$$\frac{p(x_t^N \mid s_t = i)}{p(x_t^N)} = \frac{p(s_t = i \mid x_t^N)}{P(s_t = i)} = \frac{p_t^i}{P(s_t = i)}$$

where $p_t^i = p(s_t = i \mid x_t^N)$ refers to the output of the MLP. The prior state probability $P(s_1 = i)$ can be estimated after performing a forced alignment of the training data to its true labels. Since $p(x_t^N)$ is independent of the HMM state, it can be ignored for deriving scaled likelihoods. The scaled likelihoods are applied to a Viterbi decoder for obtaining a recognized phoneme sequence.

At each time instant t, the MLP estimates a posterior probability for each phoneme or phoneme-state. Thus the output of the MLP is a posterior feature vector:

$$p_t = [p_t^1, \ldots, p_t^i, \ldots, p_t^O]^T$$

with O being the total number of phonemes or phoneme-states. In this discussion, we refer to 1-state or 3-state modeling when the number of output units equals the total number of phonemes or phoneme-states respectively.

Hierarchical Downsampling

Figure 1:
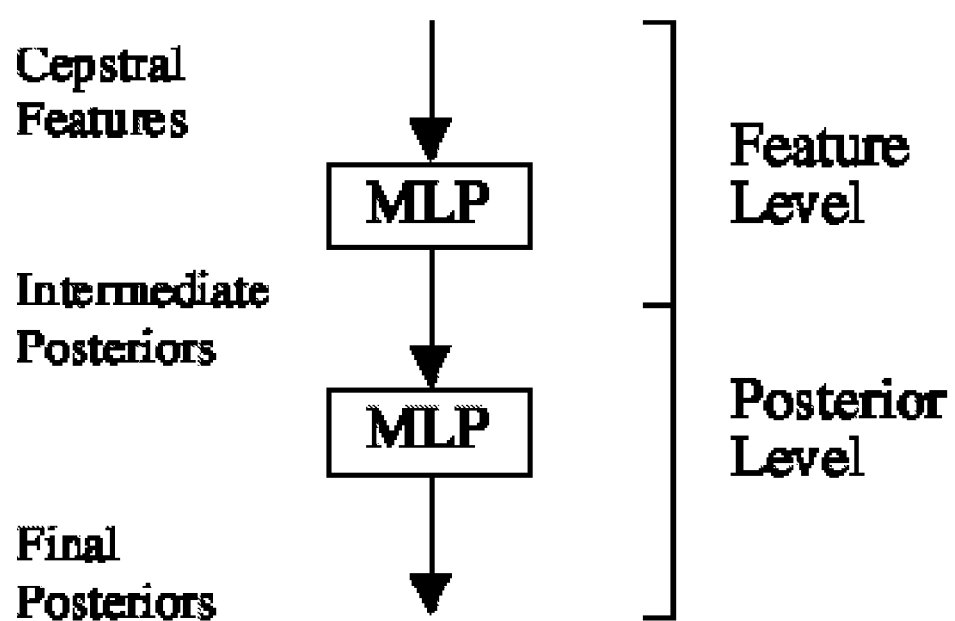
FIG. 1 shows a two-layer hierarchical structure for estimating posterior vectors for phoneme recognition.

Embodiments of the present invention are directed to an improved neural network for phoneme recognition based on a two-layer hierarchical structure based on a multi-layer perceptron (MLP). Intermediate posterior vectors generated by a first layer MLP (e.g., cepstral features level) are input to a second layer MLP (e.g., intermediate posteriors level). FIG. 1 shows a two-layer hierarchical structure for estimating posterior vectors according to embodiments of the present invention. In the first layer which is defined as context modeling at the feature level, an MLP estimates intermediate phoneme posterior vectors $p_t$ from a context of N cepstral features $x_t^N$. Redundant information contained in the intermediate posterior vectors is removed by one or more downsampling arrangements, and the second layer MLP, which provides context modeling at the posterior level, based on a window of C intermediate posterior vectors:

$$p_t^C = \left\{p_{t-\frac{C-1}{2}}, \ldots, p_t, \ldots, p_{t+\frac{C-1}{2}}\right\}$$

to estimate final phoneme posterior vectors $q_t^i = p(s_t = i \mid p_t^C)$ given phoneme posterior trajectories which constitute to some extended language model properties.

For example, in one approach referred to as window downsampling, redundant information is removed at the input window of the second layer MLP. That allows the number of parameters to be greatly reduced and reduces computational time while maintaining system accuracy requirements. Another approach referred to as temporal downsampling reduces the number of frames at the input of the second layer MLP by downsampling the intermediate posteriors based on a intermediate phonetic decoder. Such downsampling arrangements make it feasible to implement a hierarchical scheme in a real time application or in a embedded system.

Inter-Phonetic Information

Inter-phonetic information can be modeled by the second layer of the hierarchical MLP, and a window downsampling technique can then be used to make feasible a real time implementation. As explained above, a two-layer MLP hierarchical structure can be used that estimates the posterior vectors. The first layer MLP provides context modeling at the feature level by estimating intermediate phoneme posterior vectors $p_t$ from a context of N cepstral features $x_t^N$. The second layer MLP provides context modeling at the posterior level by estimating phoneme posterior vectors $q_t$ based on a window of M posterior features $p_t^C$ covering a context of C frames. In the hierarchical approach, M=C since all posterior vectors M contained in a context window of C frames were taken.

Figure 2:
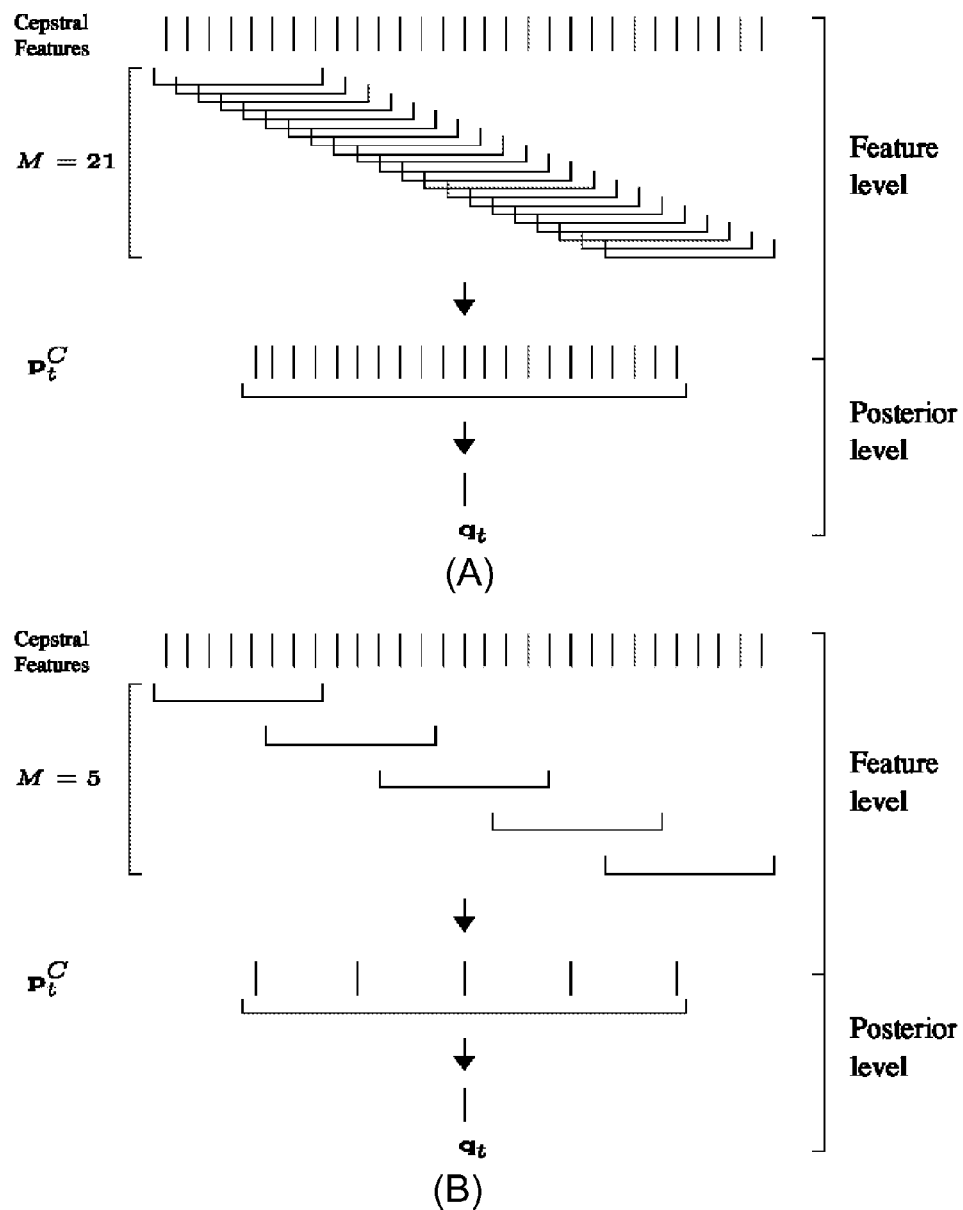
FIG. 2 compares the standard hierarchical approach for handling intermediate posterior vectors with a window downsampling approach.

FIG. 2A shows the standard hierarchical approach where a temporal window of M consecutive intermediate posterior vectors are input to a second layer MLP without downsampling. At the feature level, M different windows of cepstral features, shifted from each other by one frame, are used to generate M consecutive intermediate posterior vectors:

$$p_t^C = \left\{p_{t-\frac{C-1}{2}}, \ldots, p_t, \ldots, p_{t+\frac{C-1}{2}}\right\}$$

covering a context of C frames. Then, at the posterior level, the window of intermediate posterior vectors $p_t^C$ is input to a second layer MLP to estimate a final posterior vector $q_t$.

In practice, the sequence of intermediate posterior vectors $p_t^C$ is generated by a single MLP which is shifted over time. The M consecutive posterior vectors can be viewed as if they were derived by M MLPs situated at M consecutive time instances. In this case, each MLP has been trained based on its corresponding label $l_{t+j}$ for $$-\frac{C-1}{2} \le j \le \frac{C-1}{2}.$$

The M generated posterior vectors may have inter-phonetic information among them since the labels, which cover a context of C frames, may belong to different phonemes. Then, the final posterior vectors $q_t^i = p(s_t = i \mid p_t^C)$ are estimated based on some inter-phonetic posterior trajectories which correspond to some extended language model properties.

Context modeling at the posterior level as described in the foregoing is based on inter-phonetic information, which is useful for improving recognition accuracy since it captures how a phoneme is bounded by other phonemes. The number of posterior vectors M at the input of the second layer MLP is given by:

$$M = \frac{C-1}{T_s} + 1$$

where C is the total context of frames and $T_s$ is the frame sampling period. As an example, FIG. 3A shows a context of C=31 frames with a period of $T_s$=5, giving a number of M=7 intermediate posterior vectors at the input of the second layer MLP. On the other hand, when $T_s$=1, then M=C and the hierarchical approach given in Pinto is obtained.

Figure 3:
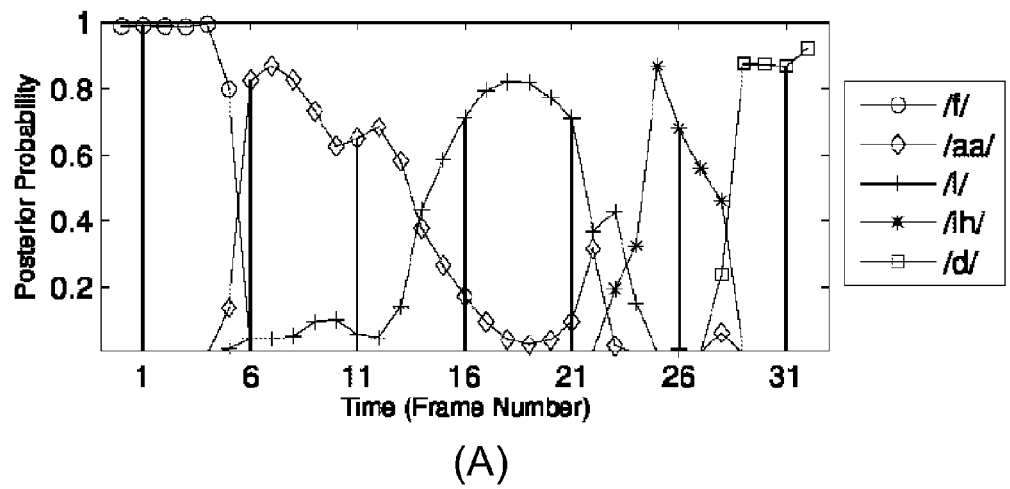
FIG. 3 A-B shows sequences of posterior vectors in a temporal context C which stretches over a period of frames.
Figure 3:
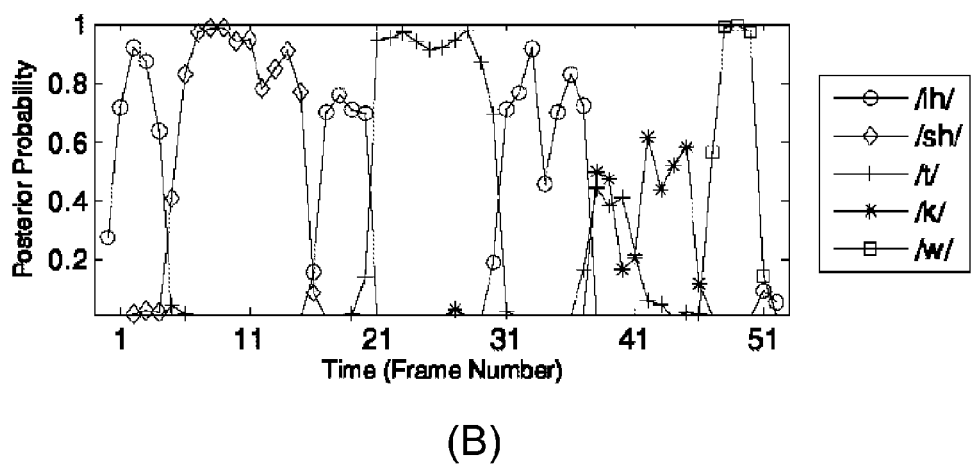

In FIG. 3 A-B, sequences of posterior vectors $p_t^C$ are given showing only those relevant components with highest posterior values within a temporal context C. It can be observed that a particular component $p_t^i$ dominates during certain sub-intervals of the whole context C since a phoneme stretches over several frames. Therefore, there is similar information contained in each sub-interval. Having all this repeated information may be irrelevant for the task of phoneme classification based on inter-phonetic information.

Testing Framework

In one specific set of testing experiments, the TIMIT corpus was used without the SA dialect sentences, dividing the database into three parts. The training data set contained 3346 utterances from 419 speakers, the cross-validation data set contained 350 utterances from 44 speakers, and the standard test data set contained 1344 utterances from 168 speakers. A 39 phoneme set (from Lee and Hon) was used with the difference that closures were merged to the regarding burst. Feature vectors were of 39-dimensions with 13 PLPs with delta and double delta coefficients. The feature vectors were under global mean and variance normalization, with each feature vector extracted from a 25 msec speech window with a 10 msec shift.

The MLPs were trained with the Quicknet software tool to implement three layer perceptrons with 1000 hidden units. The number of output units corresponded to 39 and 117 for 1-state and 3-state modeling respectively with the softmax nonlinearity function at the output. A standard back-propagation algorithm with cross-entropy error criteria was used for training the neural network, where the learning rate reduction and stop training criteria were controlled by the frame error rate in cross-validation to avoid overtraining. In addition, a phoneme insertion penalty was set to give maximum phoneme accuracy in the cross-validation. A Viterbi decoder was implemented with a minimum duration of three states per phoneme. It also was assumed that all phonemes and states were equally distributed. No language model was used and silences were discarded for evaluation. Finally, phoneme accuracy (PA) was used in all experiments as a measure of performance.

Table 1 shows the results of a set of experiments for a standard HMM/MLP system representing context modeling at the feature level for 1-state and 3-state modeling with a window of N=9 consecutive cepstral vectors.

TABLE 1

Phoneme recognition accuracies for different context modeling levels. The MLPs estimate phoneme posteriors or state posteriors for 1-state or 3-state modeling respectively.

| System | PA | |
| --- | --- | --- |
|  | 1-state | 3-state |
| no hierarchy | 68.13 | 71.21 |
| hierarchy | 71.79 | 73.61 |

In addition, results of the hierarchical approach are also given for M=21 in the second row of Table 1 where it can be observed that a remarkable increase in performance has been achieved by the hierarchical approach, as in Pinto.

Window Downsampling

FIG. 2B shows how a window downsampling approach can be used to select fewer posterior vectors which are separated by some given number of frames $T_s$. In this case, the number of MLPs M has been highly reduced according to the equation in the preceding paragraph, where each MLP is separated a number of samples $T_s$. This reduces the number of inputs to the second layer MLP, thereby decreasing thus the number of parameters while still preserving acceptable performance levels. However, the posterior vectors generated by the hierarchical downsampling approach are still covering the same temporal context C.

Several experiments were performed to test this approach in which the frame sample period $T_s$ was varied while keeping almost constant the temporal context C. Table 2 gives the results for 1-state and 3-state modeling showing phoneme recognition accuracies:

TABLE 2

Phoneme recognition accuracies for the hierarchical downsampling approach. Several sampling rates have been tested giving M intermediate posterior vectors at the input of the second layer MLP covering a temporal context of C frames.

| Sampling Parameters | | | PA | |
| --- | --- | --- | --- | --- |
| C | M | $T_s$ | 1-state | 3-state |
| 21 | 21 | 1 | 71.79 | 73.61 |
| 19 | 7 | 3 | 71.62 | 74.10 |
| 21 | 5 | 5 | 71.61 | 74.20 |
| 21 | 3 | 10 | 69.39 | 72.80 |

As expected, the performance significantly decreases when $T_s$ increases up to 10 frames. On the other hand, it is interesting to observe that the performance remains almost constant for $T_s=3$ and $T_s=5$. In particular, for $T_s=5$, good performance was obtained, but the number of input posterior vectors was greatly reduced from 21 to 5. These results confirm that there is redundant information at the input of the second layer MLP which can be ignored.

Intra-Phonetic Information

The foregoing shows how system performance can be increased when inter-phonetic information is used. In addition, the transition information within a particular phoneme can be modeled better to reflect the fact that a phoneme behaves differently at its beginning, middle, and end. The MLPs that have been trained as described above can also be used to obtain this intra-phonetic information. The inter-phonetic information in different MLPs trained according to FIG. 2B was obtained with M=5, with the same label $l_t$, which belongs to the label of the middle of the context C. Thus, there is an implicit assumption that a phoneme occupies a total context of C frames.

Table 3 gives the results when M=5 different MLPs were used for modeling inter and intra-phonetic information, as shown in FIG. 2B:

TABLE 3

Phoneme recognition accuracies in a hierarchical framework under inter or intra phonetic constraints. The number of intermediate posterior vectors at the input of the second layer MLP is M = 5, covering a temporal context of C = 21 frames.

| System | PA | |
| --- | --- | --- |
|  | 1-state | 3-state |
| no hierarchy | 68.13 | 71.21 |
| hierarchy inter | 71.61 | 74.20 |
| hierarchy intra | 70.91 | 73.65 |

Indeed, the inter-phonetic arrangement is the same as shown in Table 2 for $T_s=5$. According to Table 3, it can be observed that the inter-phonetic approach out performs the intra-phonetic approach, meaning that inter-information is more useful to better classify a phoneme. However, both approaches considerably out perform the non-hierarchical approach. And while these approaches are based on different criteria, they can serve to complement each other and further improve performance.

Combining Inter- and Intra-Phonetic Information

The foregoing discussion describes how considering inter- and intra-phonetic information can be used to considerably improve phoneme recognition performance over a non-hierarchical system. Since these two approaches were generated based on different criteria, we now consider the complementariness of both approaches in order to achieve further improvements. To that end, the intra-phonetic can be used as a first hierarchical step, then the posterior vectors generated used as the input to a second hierarchical step, given by the inter-phonetic approach. The aim such an arrangement is first to better classify a phoneme based on the temporal transition information within the phoneme. Then, temporal transition information among different phonemes is utilized to continue improving phoneme classification.

In one set of experiments, both inter-phonetic derivations at the second hierarchical step (i.e., the conventional hierarchical approach given in Pinto) and the window downsampling approach above. Table 4 shows results of the combination together with the downsampling parameters utilized in the inter-phonetic step.

TABLE 4

Phoneme recognition accuracies for a combination of inter- and intra-phonetic information.

| | | | | PA | |
|---|---|---|---|---|---|
| System | C | M | $T_s$ | 1-state | 3-state |
| no hierarchy | — | — | — | 68.13 | 71.21 |
| hierarchy intra | — | — | — | 70.91 | 73.65 |
| hierarchy intra + inter | 21 | 21 | 1 | 73.04 | 74.93 |
| hierarchy intra + inter | 21 | 5 | 5 | 72.50 | 75.07 |

The introduction of intra-phonetic information as an intermediate step in a hierarchical approach achieves further improvements. These results verify the assumption that both criteria carry complementary information, useful for improving system performance. On the other hand, results concerning the downsampling technique, using different sampling periods $T_s$, show the advantage of removing redundant information while keeping good performance.

Temporal Downsampling.

Figure 4:
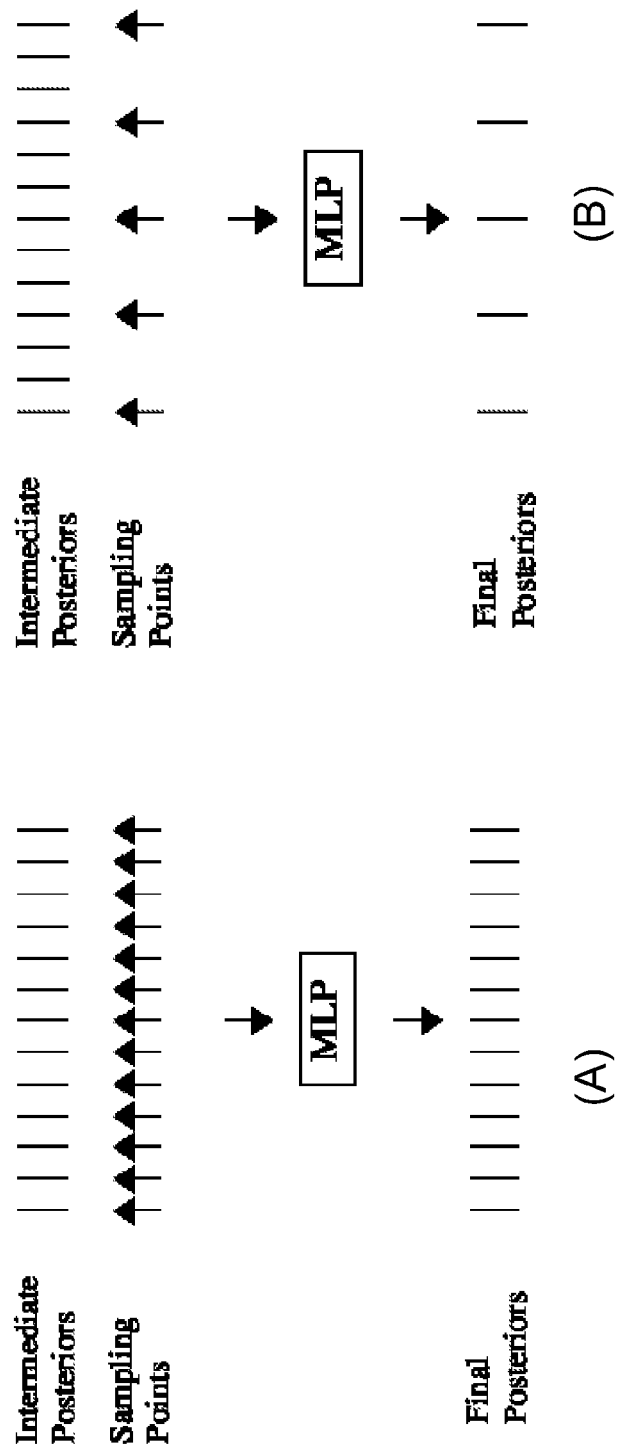
FIG. 4 compares the standard hierarchical approach for handling intermediate posterior vectors with a uniform downsampling approach.

Another approach for removing redundant information from the intermediate posterior vectors is based on temporal downsampling. FIG. 4A shows the intermediate posterior vectors for each frame sampling period $T_f$ according to the standard hierarchical approach as in Pinto. The MLP receives a set of intermediate posterior vectors which are sampled based on a impulse train which denotes how often the sampling is performed. This can be viewed as a filtering process where the intermediate posterior vectors that are not sampled are ignored by the MLP. Each intermediate posterior vector has a corresponding final posterior vector since the sampling period is $T_f=1$ frame. In FIG. 4A, each intermediate posterior vector corresponds to a window of C consecutive posterior vectors.

FIG. 4B shows a uniform downsampling scheme when $T_f=3$. Under this approach, it can be observed that a significant number of frames are reduced when $T_f$ is considerably increased. It can be shown that having just a few number of frames of final posterior vectors decreases system accuracy under constrain of minimum phoneme duration of 3-states in the Viterbi decoder. This suggests further testing this approach with minimum phoneme duration of 1-state. It is also important to mention that during training, the true labels together with the training set of intermediate posterior vectors are also downsampled, significantly reducing the training time.

Non-Uniform Downsampling

The uniform downsampling arrangement described above has the disadvantage that important information can be lost when the sampling period is highly increased. In particular, the intermediate posterior vectors corresponding to short phonemes can be totally ignored after performing the downsampling. For this reason, it may be useful to sample the set of intermediate posterior vectors every time potentially important information appears. The sampling points can be estimated by an intermediate Viterbi decoder which takes at its input the set of intermediate posteriors. Then, the sampling points correspond to those points in time where different phonemes have been recognized, generating a non-uniform downsampling arrangement. By this means, the loss of possible important information is highly alleviated, while significantly reducing the number of frames at the input of the second layer MLP.

Figure 5:
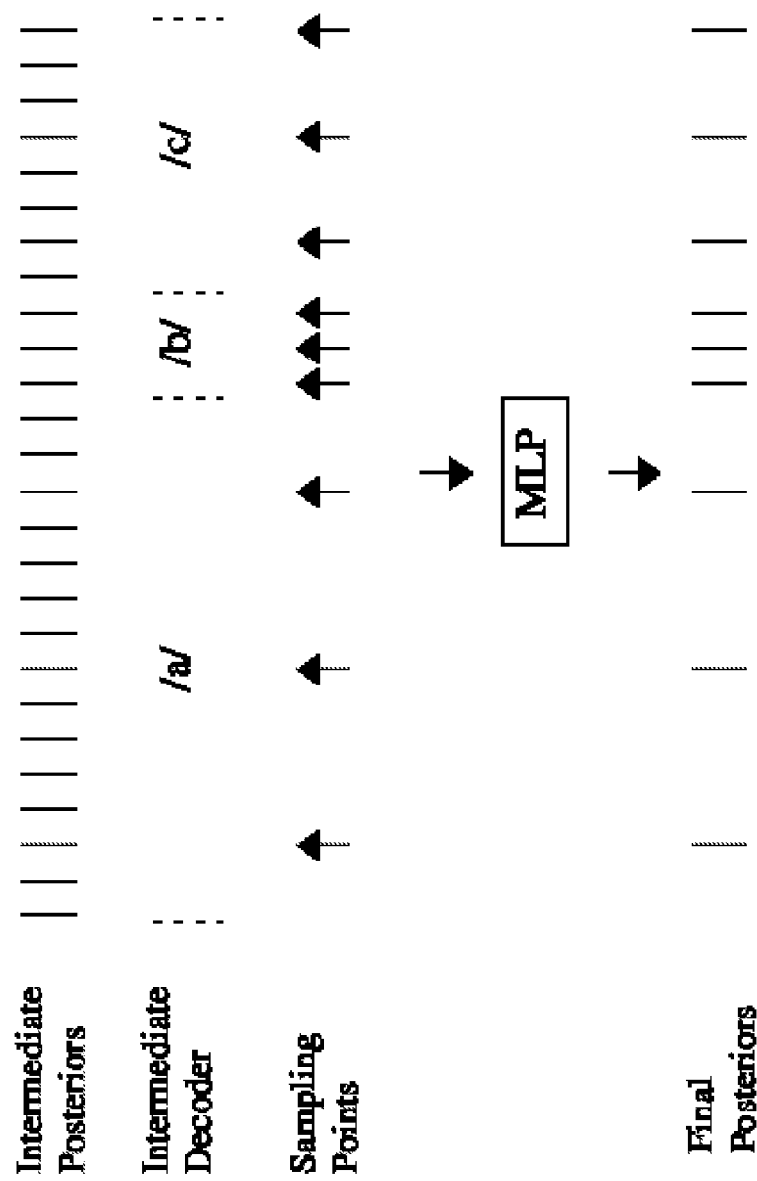
FIG. 5 illustrates a non-uniform downsampling approach.

FIG. 5 illustrates the idea of a non-uniform downsampling arrangement. A set of intermediate posterior vectors generated by the first layer MLP is input to an intermediate Viterbi decoder, which gives at its output an intermediate recognized phoneme sequence together with the phoneme boundaries. Then the recognized phoneme sequence not used further, but just the time boundaries. Each segment corresponding to a recognized phoneme is uniformly divided into three sub-segments. Then, the sampling points are indicated by the central frame of all sub-segments.

Three sampling points per recognized phoneme were used in order to keep consistency with a phoneme model of minimum 3-state duration. In addition, no word insertion penalty was used in the intermediate Viterbi decoder. Moreover, as it is performed for the uniform downsampling scheme, the training set of intermediate posteriors together with the true labels were also downsampled based on the non-uniform sampling points. For training the second layer MLP, a window of C consecutive posterior vectors was used.

In one set of experiments testing these ideas, we tested various specific MLP arrangements at the posterior level, corresponding to different hierarchical approaches: no downsampling (standard), uniform downsampling and non-uniform downsampling. All the tested MLPs, had the same number of parameters, and therefore, the computational time reduction was only due to a decrease in number of frames at the input of the second layer MLP. As in other experiments, the input of the second layer MLP for all approaches consisted of a window of C=21 intermediate posterior vectors.

For 1-state modeling, the second MLP gave an average speed of 359.63 MCPS (Million Connections Per Second) for forward propagation phase. This MLP was able to process 418.6 frames/sec. On the other hand, the MLP for 3-state modeling gave an average speed of 340.87 MCPS which processed 132.4 frames/sec. Table 5 shows the average number of frames per utterance at the input of the second layer MLP:

TABLE 5

Performance of downsampling arrangements measured in average frames per utterance and computational time.

| Downsampling | $T_t$ | frames/utt. | | time/utt. [sec] | |
| --- | --- | --- | --- | --- | --- |
| | | 1-state | 3-state | 1-state | 3-state |
| uniform | 1 | 304 | 304 | 0.72 | 2.29 |
| uniform | 3 | 100 | 100 | 0.24 | 0.75 |
| uniform | 5 | 60 | 60 | 0.14 | 0.45 |
| non-uniform | — | 123 | 101 | 0.29 | 0.76 |

Table 6 shows phoneme accuracies of the different downsampling methods:

TABLE 6

Phoneme accuracies of downsampling arrangements. The second layer MLP estimates phoneme posteriors (1-state) or state posteriors (3-state). Minimum duration constraints of 1-state and 3-state per phoneme are evaluated in the final Viterbi decoder.

| Downsampling | $T_t$ | min. dur. 1-state | | min. dur. 3-state | |
| --- | --- | --- | --- | --- | --- |
| | | 1-state | 3-state | 1-state | 3-state |
| uniform | 1 | 71.86 | 70.36 | 71.79 | 73.61 |
| uniform | 3 | 71.21 | 67.18 | 58.80 | 55.93 |
| uniform | 5 | 68.15 | 67.17 | 39.92 | 37.27 |
| non-uniform | — | 72.04 | 70.69 | 71.86 | 73.39 |

For uniform downsampling, three different sampling periods $T_t$ were tested. And for $T_t=1$, the standard hierarchical approach was obtained as it is given in Pinto. It can be seen in Table 5 that the computational time was considerably reduced when $T_t$ was increased, since there were fewer frames to process by the second layer MLP. But, the system accuracy dropped significantly. For this approach, it can be observed that it is necessary to use a minimum duration of 1-state in the final decoder in order to keep a reasonably good accuracy.

One reason of the low accuracy obtained when $T_t$ was increased was caused by the poor classification of short phonemes. When the sampling period is extremely increased, only a few samples corresponding to short phonemes may remain, or they even may totally disappear. This effect was verified by measuring the phoneme recognition of short phonemes when $T_t=5$. The shortest phonemes of the TIMIT corpus are given by /dx/ and /dh/ with an average number of frames of 2.9 and 3.5, respectively. And in fact, those phonemes suffered the highest deterioration after downsampling with a decrease in phoneme recognition from 69% to 50% and from 68% to 59%, for /dx/ and /dh/ respectively.

For the non-uniform downsampling arrangement, Table 5 shows that a high reduction in the number of frames is achieved—by 59.5% and 66.8% for 1-state and 3-state modeling, respectively—which reduced computational time in the same proportion. Moreover, the computational time required by the intermediate decoder for processing one utterance was neglected compared to the time required by the second layer MLP in processing the same utterance. Table 6 shows that a similar accuracy is obtained, compared to the standard approach. This shows a significant advantage of non-uniform downsampling where a high decrease of computational time is obtained while keeping good performance.

These results confirm that there is a large amount of redundant information contained in the intermediate posterior vectors, and therefore, it is not necessary for the second layer MLP to again process each individual frame of the entire utterance. Various strategies have been described for downsampling the intermediate posterior vectors. One especially promising approach was obtained by non-uniform downsampling where the sampling frequency is estimated by an intermediate Viterbi decoder. This reduced the computational time by 67% while maintaining system accuracy comparable to the standard hierarchical approach. These results suggest the viability of implementing a hierarchical structure in a real-time application.

Embodiments of the invention may be implemented in any conventional computer programming language. For example, some or all of an embodiment may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:
1. A computer based method implemented using at least one hardware implemented processor for phoneme recognition comprising:
 using the at least one hardware implemented processor to perform the steps of:

generating a sequence of intermediate phoneme posterior vectors from an input sequence of cepstral features using a first layer perceptron that provides feature-level context-modeling;

using an intermediate phoneme time boundary decoder to determine a sequence of sampling segments as a function of the intermediate phoneme posterior vectors, each sampling segment defined by a phoneme start boundary and a phoneme stop boundary;

downsampling the intermediate phoneme posterior vectors by sampling the sequence of intermediate phoneme posterior vectors a fixed number of times in each sampling segment to form a reduced input set of intermediate phoneme posterior vectors for a second layer perceptron;

generating a sequence of final phoneme posterior vectors from the reduced input set of intermediate phoneme posterior vectors using the second layer perceptron based on posterior-level context modeling of inter-phonetic information; and decoding the final phoneme posterior vectors using a final phoneme recognition decoder to determine an output recognized phoneme sequence representative of the input sequence of cepstral features.

2. A method according to claim 1, wherein decoding the final posterior vectors uses intra-phonetic information.

3. A method according to claim 1, wherein the downsampling is based on a window downsampling arrangement.

4. A method according to claim 1, wherein the perceptrons are arrangements within a Hybrid Hidden Markov Model-Multilayer Perceptron (HMM-MLP) phoneme classifier.

5. A computer-based automatic speech recognition application implemented using the hardware implemented processor and adapted to use a hierarchical neural network to perform the method according to claim 1.

6. A computer-based automatic speech recognition application according to claim 5, wherein the application is a real time application.

7. A computer-based automatic speech recognition application according to claim 5, wherein the application is an embedded application.

* * * * *